Aug. 19, 1924.　　　　　　　　　　　　　　　　1,505,816
C. W. STEELE
MOLD FOR VULCANIZING HOLLOW ARTICLES
Filed July 17, 1922　　　2 Sheets-Sheet 2
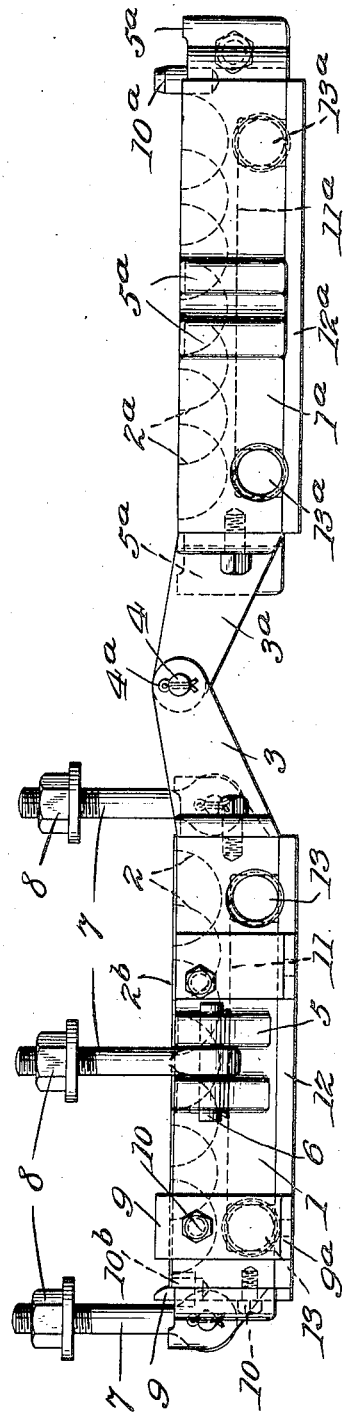
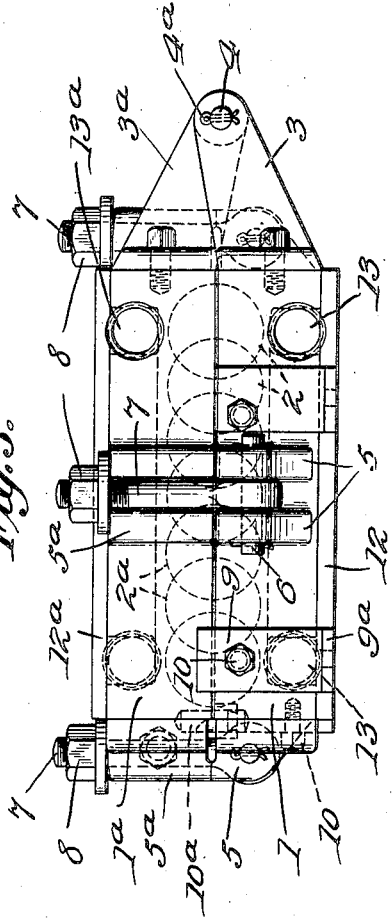
Inventor:
Charles W. Steele,
by Spear Middleton Donaldson & Hall
Attys.

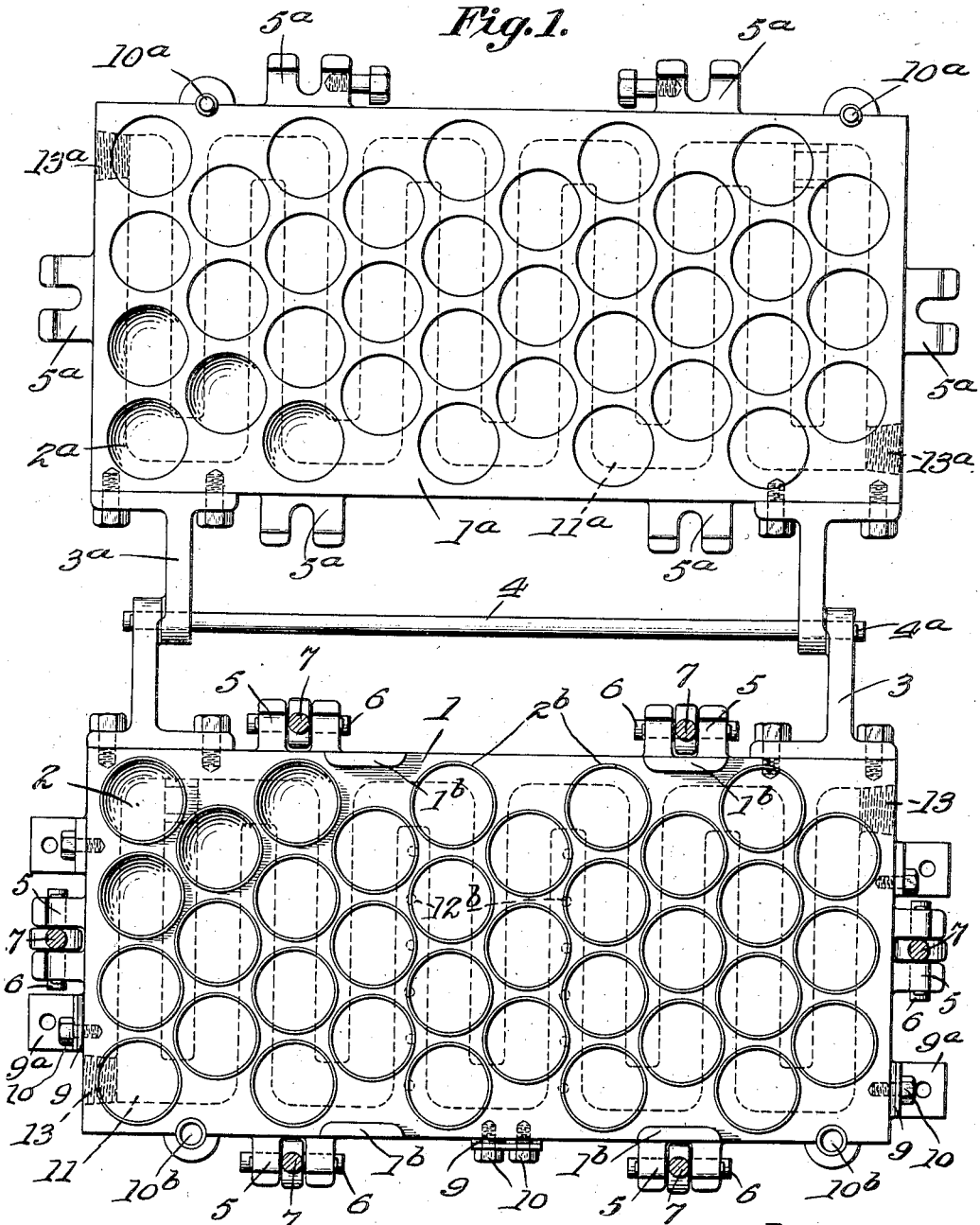

Patented Aug. 19, 1924.

1,505,816

UNITED STATES PATENT OFFICE.

CHARLES W. STEELE, OF AKRON, OHIO, ASSIGNOR TO THE MILLER RUBBER COMPANY, OF AKRON, OHIO, A CORPORATION OF OHIO.

MOLD FOR VULCANIZING HOLLOW ARTICLES.

Application filed July 17, 1922. Serial No. 575,531.

*To all whom it may concern:*

Be it known that I, CHARLES W. STEELE, a citizen of the United States, and a resident of Akron, in the county of Summit and State of Ohio, have invented certain new and useful Improvements in Molds for Vulcanizing Hollow Articles, of which the following is a specification.

My present invention relates to improvements in molds for curing or vulcanizing rubber articles and is designed more particularly for the vulcanizing of hollow rubber playing balls. The invention aims to provide a mold which will produce an article which will have a smooth exterior finish and which will not have a rind or annular ridge, which is generally formed in the ordinary vulcanizing molds by the material being forced into the parting line of the mold.

A further object is to provide a mold which will first be heated to the particular temperature to vulcanize the articles and which may thereafter be quickly cooled, and I also aim to provide a mold in which a plurality of articles may be vulcanized simultaneously, and in which the heating and cooling medium will be led into close proximity to the mold cavities.

With these and other objects in view, the invention includes the novel features of construction and arrangement and combination of parts hereinafter described, the nature and scope of my invention being particularly defined and determined by the claims appended hereto.

A mold constructed in accordance with my invention is illustrated in the accompanying drawings, in which—

Figure 1 is a plan view of the mold opened out so as to show both mold sections in face view.

Fig. 2 is an end view of the same, and

Fig. 3 is an end elevation with the mold sections brought together in article vulcanizing position.

Referring more particularly to these drawings, the numeral 1 indicates one section, for example, the base member of the mold, and 1ª the complementary section. Each of these sections is provided with mold cavities 2 and 2ª which are duplicates of each other, and shaped to conform to the shape of the article to be vulcanized therein. In the present instance, each of the complementary mold cavities would be of semi-spherical formation, as shown. These two mold sections are hinged together conveniently by overlapping bracket members 3 and 3ª and a hinge rod 4 passing through aligning openings in said brackets and secured in position by cotter pins or the like, as indicated at 4ª.

In the manufacture of rubber balls for playing purposes, it is desirable that there shall be absolutely no rind present on the ball and that the ball shall have a smooth exterior finish, or, in other words, that the balls shall be as perfect spheres as possible. To do this, I find that the molds must be made of an exceedingly close grained material which will take a high polish, and the best material which I have found for this purpose is a high grade rolled steel plate, the mold cavities being formed therein by machining.

To insure that no rind shall be formed at the parting line of the mold I form one of the mold plates with projecting lands surrounding the mold cavities, as indicated at 2ᵇ, these lands being in the shape of annular flanges, as shown, the inner faces of which are perfect continuations of the semi-spherical surfaces of the corresponding mold cavities. The edges of these lands are accurately machined so as to lie in exactly one and the same plane, and the coacting surface of the mold section 1ª is also accurately machined. When the mold section 1ª is superimposed upon the section 1 by swinging it upon its hinges and pressure is applied thereto, the narrow lands produce a very accurate fit, so close as to preclude the possibility of any of the rubber being forced into the parting line of the mold.

It will be understood that the balls or hollow articles for which this invention is particularly designed are provided with a blower material which is gasified by the vulcanizing heat, so that the ball is vulcanized under internal pressure. Intimate contact or pressure of the mold sections together is accomplished preferably by means of clamping lugs and bolts which comprise the lugs 5 preferably welded to the sides and ends of the lower section 1, and having transverse openings therethrough in which are located pivot pins 6 which carry clamping bolts 7 designed to engage the forked lugs 5ª of the section 1ª, such bolts carrying clamping nuts, as indicated at 8, which may be tightened to secure the requisite pressure.

Front and ends of the mold section 1 are provided with angle plates 9 which have vertical portions secured to the vertical end and front walls of said mold section in a suitable manner, as by tap screws 10, these angle plates having horizontal portions 9ª provided with perforations which allow the base member 1 of the mold to be bolted to a table, bench or other support. At points adjacent the clamps at the front and rear sides the mold section 1 is provided with lands or ribs 1ᵇ which are of exactly the same height as the lands 2ᵇ and which support the mold plates where the pressure of the clamping lugs comes and prevent any springing of the same.

The vertical portions of the brackets 9 are projected up above the recessed surface of the mold member 1 to cooperate with the corresponding face of the upper section to serve the purpose of aligning the mold sections, or, in other words, to act in the same manner as dowels. Additional dowels, however, are provided at the corners in the shape of dowel pins 10ª cooperating with dowel recesses 10ᵇ in the lower mold section.

In order to produce articles which shall be as perfect as possible, or, in other words, which shall correspond exactly to the mold cavities in operating on hollow articles which are expanded by an internal gasifying agent, it is necessary that the molds shall be capable of being quickly and uniformly heated to cure the balls, and shall be capable of being quickly and uniformly cooled to cause the balls to set or harden of uniform size and perfect shape. To accomplish this I provide the mold sections with sinuous channels which pass in a zig-zag manner back and forth across the mold sections in alignment with the mold cavities, which passages are adapted for connection by flexible supply pipes and suitable controlling cocks to suitable sources of heating and cooling fluid, such sources and connections not being shown. The preferred manner of forming these heating and cooling passages is to machine the back or outer face of each mold section to produce sinuous grooves, as indicated at 11 and 11ª, which grooves are covered by relatively thin steel plates 12 and 12ª which are preferably attached by being autogenously welded around their edges and at intermediate points to the bridges or portions between the grooves, which welding may be conveniently accomplished by drilling holes 12ᵇ into the cover plates to facilitate the welding. Inlet and outlet connections are drilled and tapped into the ends of the mold sections, as indicated at 13 and 13ª.

A mold such as above described will produce an article without any rind or flange, for the reason that the lands surrounding the mold cavities may be perfectly machined and will impinge the surface of the adjacent mold section with such a tight fit as to absolutely prevent any material being forced into the parting line of the mold.

The mold can be made of rolled steel of very high grade, susceptible of a high polish, which will give an exceedingly smooth finish to the articles produced, is easy to manipulate, as it can be opened and closed by hand, requiring no power device, and a large number of balls may be cured at one time, and the mold quickly heated to vulcanize the balls and cooled to set them to size respectively.

Furthermore, the mold cavities are easily accessible for cleaning, and they must be kept scrupulously clean to produce perfect articles.

Having thus described my invention, what I claim is:

1. A mold of the character described, comprising complementary mold sections having mating cavities, and annular lands surrounding the cavities of one section and cooperating with the plane face of the other section, means for holding said sections pressed together, and thrust sustaining lands carried by one of said sections.

2. A mold of the character described, comprising a pair of complementary mold sections of rolled steel having mating cavities machined therein.

3. A mold of the character described, comprising a pair of complementary mold sections of rolled steel having mating cavities machined therein, one of said mold sections having its surface machined away to provide annular lands around the mold cavities thereof.

In testimony whereof, I affix my signature.

CHARLES W. STEELE.